Sept. 21, 1926.  J. J. WICKHAM  1,600,262
AUTOMATIC LUBRICATOR
Filed Sept. 11, 1925    3 Sheets-Sheet 1
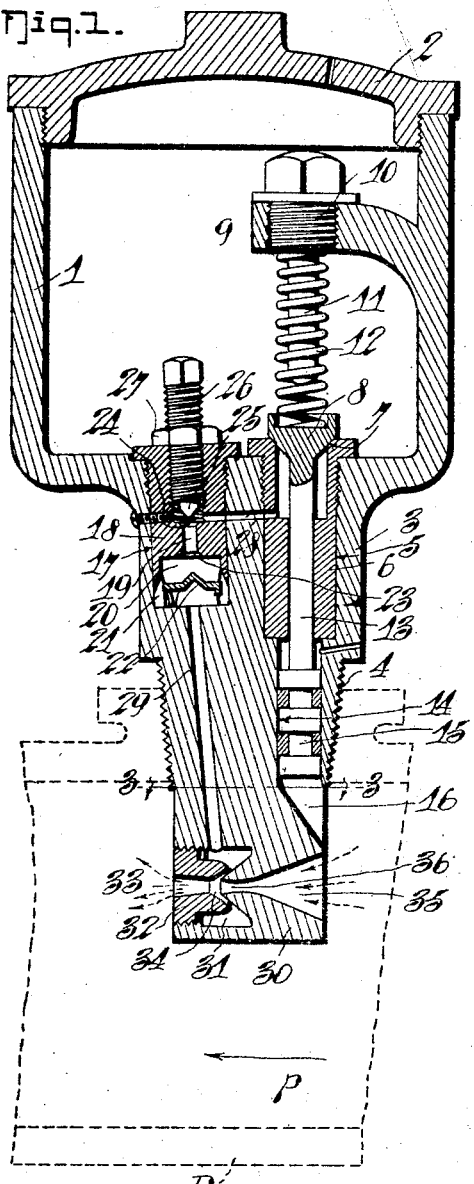
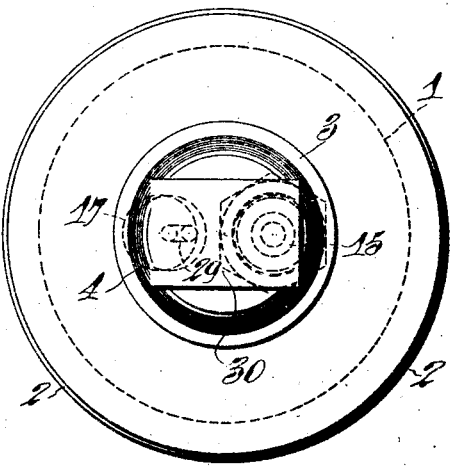
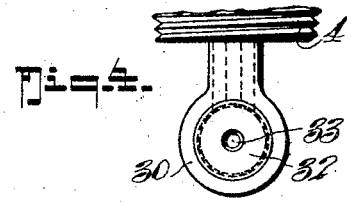
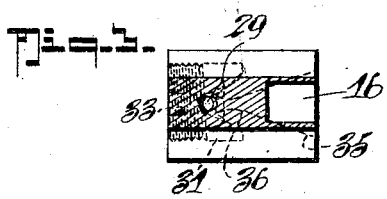
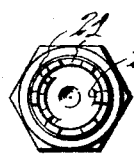
INVENTOR
J. J. Wickham.
BY
ATTORNEY Sept. 21, 1926.  J. J. WICKHAM  1,600,262
AUTOMATIC LUBRICATOR
Filed Sept. 11, 1925   3 Sheets-Sheet 2
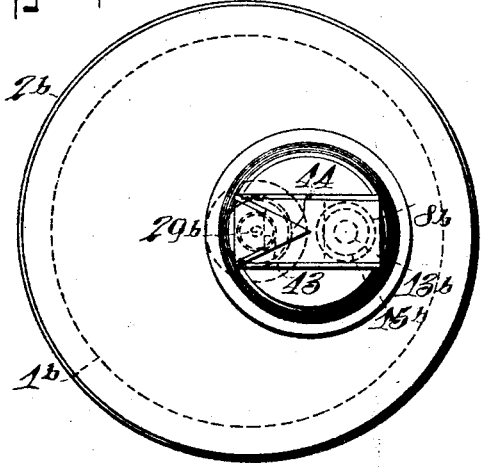
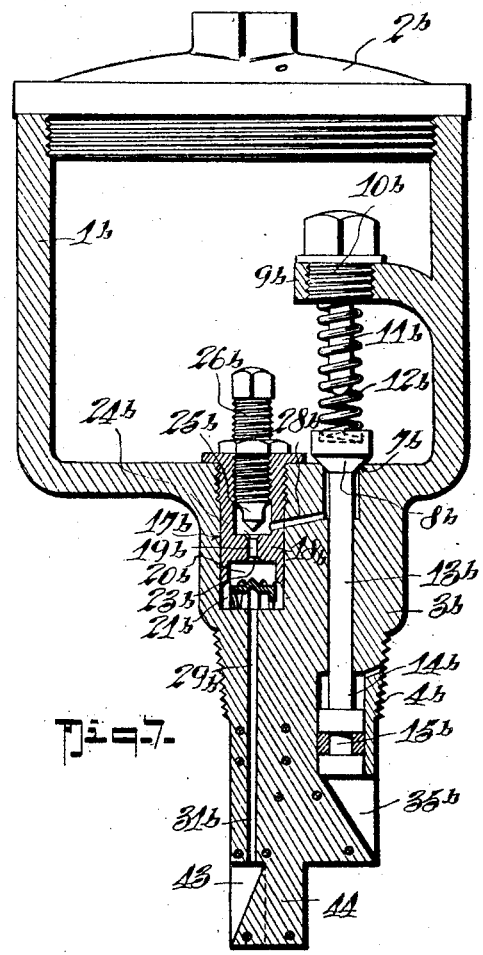
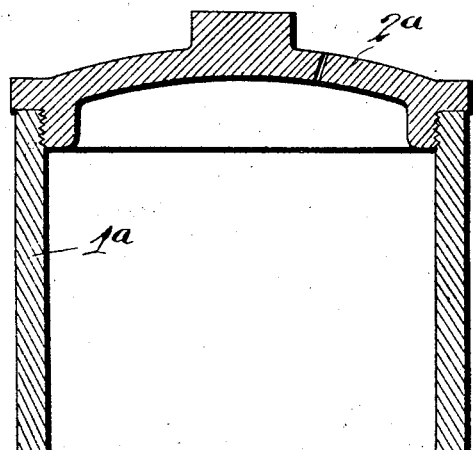
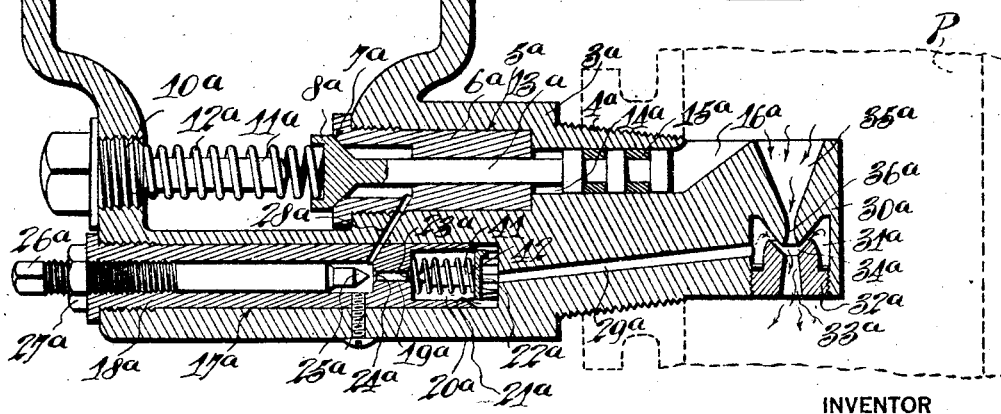
INVENTOR
J. J. Wickham.
BY
ATTORNEYS Sept. 21, 1926. 1,600,262
J. J. WICKHAM
AUTOMATIC LUBRICATOR
Filed Sept. 11, 1925 3 Sheets-Sheet 3
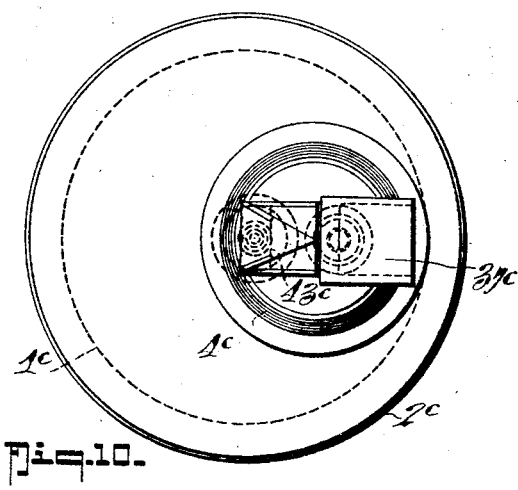
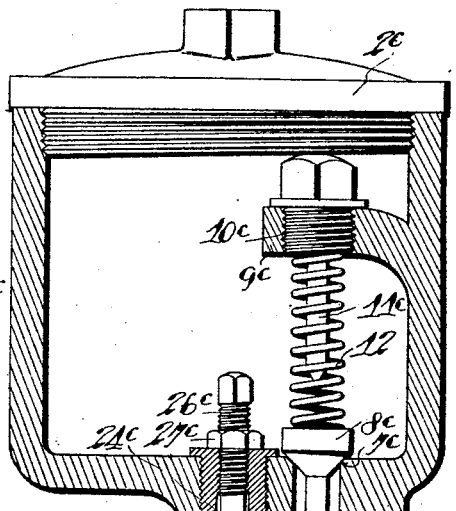
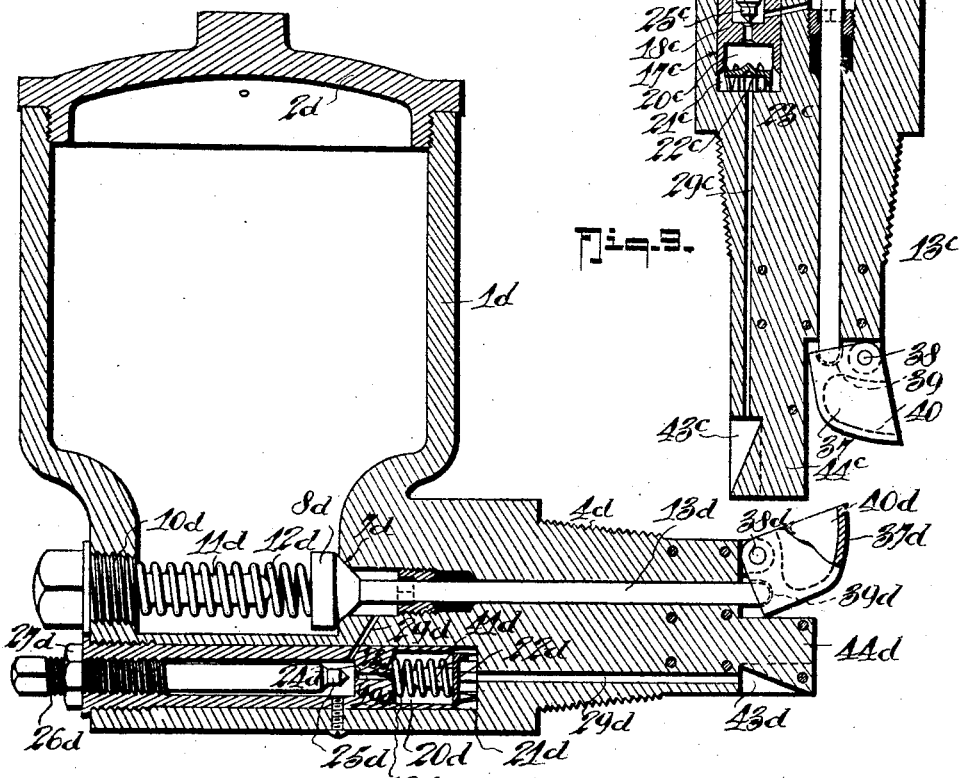
INVENTOR
J. J. Wickham.
BY Albert E. Dietrich
ATTORNEYS.

Patented Sept. 21, 1926.

1,600,262

UNITED STATES PATENT OFFICE.

JOHN JAMES WICKHAM, OF KINGSTON, ONTARIO, CANADA.

AUTOMATIC LUBRICATOR.

Application filed September 11, 1925. Serial No. 55,843.

My invention relates to certain new and useful improvements in lubricators for delivering automatically a supply of lubricant into a steam or air pipe line, the operation of the lubricator being governed by the pressure and flow of the fluid in the pipe line.

Primarily the invention has for its object to provide such a lubricator of a simple and inexpensive construction that will readily effect its purpose and which will embody in its make-up means for preventing the steam or air pressure from forcing the lubricant back into the lubricant reservoir chamber when the control valve is opened and before the flow of fluid in the pipe line has been established, and which embodies means to adjust the outflow of lubricant, as desired.

Another object of the invention is to provide means positively to draw the lubricant from the reservoir and deliver it into the pipe line by means of the aid of an ejector device built as a part of the lubricator.

Generically the invention comprises a reservoir and a neck with a duct from the reservoir through the neck, the duct being controlled by a feed valve which is normally closed but is adapted to be opened by the pressure established in the steam or air line, the duct being provided with a back check valve and a regulator valve so designed that the check valve will close the duct upon establishment of a positive static pressure within the pipe line but will be opened when the fluid in the pipe line begins to flow, provision being made to cause a suction at the discharge end of the duct by the action of the flowing fluid stream in the pipe line, thereby to insure unseating of the check valve and withdrawal of the lubricant from the reservoir.

In its more specific nature, the invention also resides in those novel features of construction, combination and arrangement of parts, all of which will hereinafter be fully described, then be specifically pointed out in the appended claims and illustrated in the accompanying drawings, in which:—

Figure 1 is a vertical longitudinal section of one embodiment of my invention.

Figure 2 is an inverted plan view of the same.

Figure 3 is a detail section on the line 3—3 of Figure 1.

Figure 4 is a detail elevation of the ejector member.

Figure 5 is an end view of the valve cage with check valve.

Figure 6 is a vertical longitudinal section of another embodiment of the invention, the same being a modification of that shown in Figure 1.

Figure 7 is a view similar to Figure 1 of another embodiment of my invention.

Figure 8 is a bottom plan view of the embodiment shown in Figure 7.

Figure 9 is a view similar to Figures 1 and 7 of a further modification of the invention.

Figure 10 is an inverted plan view of the embodiment shown in Figure 9.

Figure 11 is a central vertical longitudinal section of a modification of the embodiment shown in Figure 9.

Referring to the accompanying drawings, in which like numerals and letters of reference indicate like parts in all the figures, and referring particularly to the embodiment of the invention shown in Figures 1—5 inclusive, it will be seen that my improved lubricator comprises a reservoir portion 1 in which the lubricant is contained and which is closed by a suitable cap 2. The reservoir portion is provided with a neck 3 that has a threaded portion 4 by which the lubricator may be screwed into place into the pipe or duct 7 which it is desired to deliver the lubricant. The neck 3 in this embodiment of the invention is chambered at 5 for the reception of the valve seat and stem guide member 6, the latter having the chamber provided with the valve seat 7 to receive lubricant when the control valve 8 is open.

9 is a bracket into which the control valve spring guide screw 10 is threaded, the latter carrying the guide pin 11 for the valve spring 12 that is designed normally to seat the valve 8.

13 designates the control valve stem which has a packed piston 15 to operate in the piston chamber 14 in the neck of the lubricator, the chamber 14 having a tapered entrance 16 below the piston for a purpose presently understood.

17 is the needle and check valve cage chamber into which is threaded the needle and check valve cage 18. The cage 18 has a passage 19 which is controlled by an adjustable needle valve 20 in cooperation with the seat 24 and which also has a seat 23 to cooperate with the back check valve 22 that works in the chamber 20. The cage 18 has grooved walls 21 to permit the oil to flow around the valve 22 when the latter is unseated. The needle valve proper 25 is carried on a cap screw 26 which is tapped into the cage member 18 and is held by a jamb nut 27.

28 is a duct for conveying the lubricant from the chamber of the member 6 to the passage 19, and 29 is a duct that conveys the lubricant from the check 20 to a chamber 31 in a cylindrical projection 30 extending from the neck of the lubricator.

32 is an ejector nipple screwed into the cylindrical portion 30 to project into the chamber 31 and it is provided with a passage through the same having a flared entrance 34 and a more restricted nipple 33, the flared entrance 34 cooperating with the restricted discharge opening 36 of the passage 35 through which the fluid stream in the pipe passes.

In the practical operation of this embodiment of the invention, the lubricator is screwed into the pipe or duct P which may be the steam line of a steam engine or the intake manifold of an internal combustion engine, the lubricator being so positioned that the entrance 35 of the ejector device and the tapered entrance 16 will be opposed to the direction of flow of the fluid within the duct P. The lubricant is placed in the reservoir 1, the needle valve 26 having first been adjusted to feed the desired amount of lubricant. Now when fluid is admitted to the duct P, a pressure is established which causes the valve 22 to engage the seat 23 and also causes the piston 15 to open the valve 8. While the fluid remains static under pressure within the duct P the valve 22 will remain closed so that lubricant will not flow from the reservoir 1 to the chamber 31 but as soon as the engine begins to turn over so that the fluid stream indicated by the arrow $p$ in Figure 1 begins to move a negative pressure is produced in the chamber 31 by the suction caused by the moving fluid stream through the passages 35, 36, 34, 33, and thus withdraws the valve 22 from its seat 23 and permits the lubricant to flow through the ducts 28, 19, 29, 30, 34, 33 and be ejected into the fluid stream within the duct P by which fluid stream the lubricant is conveyed to the desired place.

In Figure 6, I have shown a modification of the embodiment of the invention shown in Figure 1 adapted for vertical pipe lines P. In this figure, the parts corresponding in purpose and function to like parts in Figure 1 carry the same reference character plus the index letter $a$ so that a detail description of that construction is thought to be unnecessary. When this embodiment of the invention is utilized the valve $22^a$ is provided with an elongated portion 41 and a light spring 42 is provided normally holding the valve $22^a$ from seating.

In Figures 7 and 8 I have illustrated another embodiment of the invention which is a modification of that shown in Figures 1 and 2 and in these figures also those parts having the same purpose and function bear the same reference character plus the letter $b$. In this embodiment, the ejector function is obtained by the peculiar shaped recess 43 into which the duct $29^b$ delivers, the recess 43 being located in the triangular projection 44, the triangular projection 44 having its apex faced in the direction from which the fluid stream rises within the duct into which the lubricator is tapped.

In Figure 9, I have shown another modification of my invention. In this figure, instead of employing the piston 15, I provide a bucket 37 which is pivoted at 38 and has a recess 39 to receive the end of the stem $13^c$, the bucket having its opening 40 located in the direction from which the flowing fluid stream comes so that when the fluid stream engages the bucket 37 it will turn it on its pivot in a direction such as will raise the stem $13^c$ and open the valve $8^c$ and permit lubricant to flow through the passage controlled by that valve. As the remaining parts of this embodiment of the invention are substantially as in the embodiment shown in Figure 7 further description of this form of the invention is thought to be unnecessary.

In Figure 11 is shown a modification of the embodiment of the invention shown in Figure 9 and in this figure the parts having the same purpose and function as those in the preceding figure bear the same reference character plus the index letter $d$ so a detail description of this embodiment of the invention is thought to be unnecessary. The embodiment of Figure 11, like the embodiment of Figure 6, is designed for use where the duct P is located vertically, while the embodiment shown in Figures 1, 7 and 9 will have use with horizontally positioned ducts P.

From the foregoing description, taken in connection with the accompanying drawings, it is thought the complete construction, operation and advantages of the invention will be clear to those skilled in the art, and while I have illustrated several embodiments of my invention, I desire it understood that other changes in the details of construction and arrangement of parts may be made without departing from the spirit of the invention or the scope of the appended claims.

What I claim is:—

1. In automatic lubricators which are adapted for association with a pipe line for fluids; a reservoir body having a neck provided with a lubricant duct having a discharge end and and having a valve controlled entrant end, a normally closed valve controlling said entrant end, means to unseat said valve upon establishment of a positive pressure in the pipe line, a back check valve in said duct and an adjusting valve in said duct, and a variable pressure means for causing outflow of lubricant through said duct.

2. In automatic lubricators which are adapted for association with a pipe line for fluids; a reservoir body having a neck provided with a lubricant duct having a discharge end and having a valve controlled entrant end, a normally closed valve controlling said entrant end, means to unseat said valve upon establishment of a positive pressure in the pipe line, a back check valve in said duct, and means at the exit end of said duct for establishing a negative pressure there by flow of fluid in the pipe line whereby to draw the fluid through the duct from the reservoir.

3. In automatic lubricators which are adapted for association with a pipe line for fluids; a reservoir body having a neck provided with a lubricant duct having a discharge end and having a valve controlled entrant end, a normally closed valve controlling said entrant end, means to unseat said valve upon establishment of a positive pressure in the pipe line, a back check valve in said duct and an adjusting valve in said duct, and means at the exit end of said duct for establshing a negative pressure there by the flow of fluid in the pipe line whereby to draw the fluid through the duct from the reservoir.

4. In automatic lubricators which are adapted for association with a pipe line for fluid; a reservoir body having a neck provided with a lubricant duct having a discharge end and having a valve controlled entrant end, a normally closed valve controlling said entrant end, and means to unseat said valve upon establishment of a positive pressure in the pipe line, and a normally opened check valve in said duct adapted to be seated by positive pressure within the duct toward the exit side of the check valve.

5. In automatic lubricators which are adapted for association with a pipe line for fluids; a reservoir body having a neck provided with a lubricant duct having a discharge end and having a valve controlled entrant end, a normally closed valve controlling said entrant end, means to unseat said valve upon establishment of a positive pressure in the pipe line, a normally opened check valve in said duct adapted to be seated by positive pressure within the duct toward the exit side of the check valve, and means, as an ejector device, at the exit end of said duct to establish negative pressure in said duct during flow of fluid in the pipe line thereby to suck lubricant through said duct and eject it into the fluid stream.

6. In automatic lubricators of the class described, a body comprising a reservoir and a neck, the latter having a duct to deliver lubricant from the reservoir into a pipe line with which the lubricant is adapted to be associated, a control valve normally closing the passage into said duct and having means for unseating the valve upon the establishment of a positive pressure against it from the pipe line, a combined adjusting and back check valve cage located in said duct to control the passage of lubricant from the entrant to the exit end of the duct, an adjusting needle valve and a normally open check valve located in said cage, said cage having valve seats for said needle and check valves respectively, said check valve being adapted to seat upon establishment of a back pressure in said duct.

7. In automatic lubricators of the class described, a body comprising a reservoir and a neck, the latter having a duct to deliver lubricant from the reservoir into a pipe line with which the lubricant is adapted to be associated, a control valve normally closing the passage into said duct and having means for unseating the valve upon the establishment of a positive pressure against it from the pipe line, a combined adjusting and back check valve cage located in said duct to control the passage of lubricant from the entrant to the exit end of the duct, an adjusting needle valve and a normally open check valve located in said cage, said cage having valve seats for said needle and check valves respectively, said check valve being adapted to seat upon establishment of a back pressure in said duct, and means for causing the fluid in the pipe line to exert pressure to open said control valve and for drawing lubricant from said reservoir into the pipe line through said duct at times.

8. In automatic lubricators of the class described, a body comprising a reservoir and a neck, the latter having a duct, to deliver lubricant from the reservoir into a pipe line with which the lubricant is adapted to be associated, a control valve normally closing the passage into said duct and having means for unseating the valve upon the establishment of a positive pressure against it from the pipe line, a combined adjusting and back check valve cage located in said duct to control the passage of lubricant from the entrant to the exit end of the duct, an adjusting needle valve and a normally open check valve located in said cage, said cage having valve seats for said needle and check valve respectively, said check valve being adapted to seat upon establishment of a back pressure in said duct, said neck having an ejector unit at its lower end communicating with said duct for the purpose specified.

9. In automatic lubricators of the class described, a body comprising a reservoir and a neck, the latter having a duct to deliver lubricant from the reservoir into a pipe line with which the lubricant is adapted to be associated, a control valve normally closing the passage into said duct and having means for unseating the valve upon the establishment of a positive pressure against it from the pipe line, a combined adjusting and back check valve cage located in said duct to control the passage of lubricant from the entrant to the exit end of the duct, an adjusting needle valve and a normally open check valve located in said cage, said cage having valve seats for said needle and check valves respectively, said check valve being adapted to seat upon establishment of a back pressure in said duct, said neck having a chamber in its end and a passage with a restricted-opening into said chamber, and a plug for said chamber having a passage associated with said restricted-opening passage as an ejector, said duct delivering into such neck chamber.

10. In automatic lubricators of the class described, a body comprising a reservoir and a neck, the latter having a duct to deliver lubricant from the reservoir into a pipe line with which the lubricant is adapted to be associated, a control valve normally closing the passage into said duct and having means for unseating the valve upon the establishment of a positive pressure against it from the pipe line, a combined adjusting and back check valve cage located in said duct to control the passage of lubricant from the entrant to the exit end of the duct, an adjusting needle valve and a normally open check valve located in said cage, said cage having valve seats for said needle and check valves respectively, said check valve being adapted to seat upon establishment of a back pressure in said duct, a valve stem for said control valve, said stem having a piston, and a neck having a chamber for said piston with an opening below the piston arranged to face the oncoming stream of fluid in the pipe line, said neck also having a chamber into which said duct delivers and which is located to face away from the oncoming stream of fluid in the pipe line for the purposes specified.

11. In automatic lubricators which are adapted for association with a pipe line for fluids; a reservoir having a neck provided with a lubricant duct having a discharge end and having a valve controlled entrant end, a normally closed valve controlling said entrant end, and means to unseat said valve upon establishment of a positive pressure in the pipe line, said duct having a chamber, a back check valve in said chamber adapted upon the establishment of an excessive pressure in the pipe line to close said duct.

12. In automatic lubricators which are adapted for association with a pipe line for fluids; a reservoir having a neck provided with a lubricant duct having a discharge end and having a valve controlled entrant end, a normally closed valve controlling said entrant end, means to unseat said valve upon establishment of a positive pressure in the pipe line, said duct having a chamber, a back check valve in said chamber adapted upon the establishment of an excessive pressure in the pipe line to close said duct, and a needle valve regulating the passageway area of said duct.

JOHN JAMES WICKHAM.